Dec. 31, 1929.  C. T. HATCH  1,741,155
COATING MACHINE
Filed May 1, 1926    2 Sheets-Sheet 1
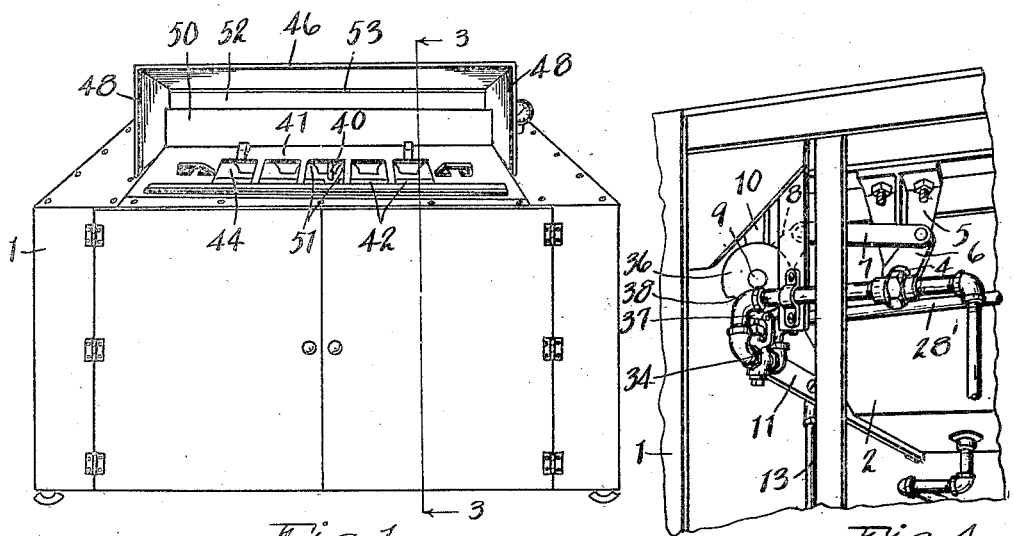
Fig. 1
Fig. 4
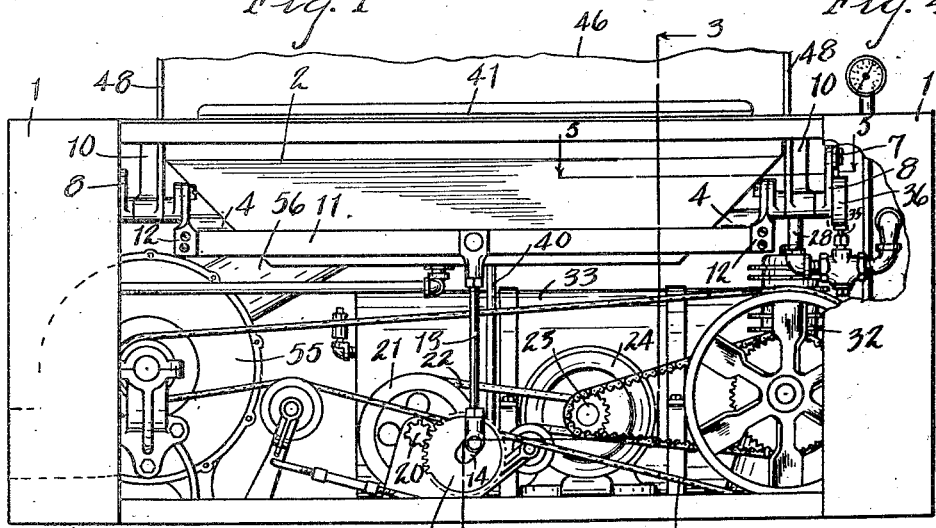
Fig. 2
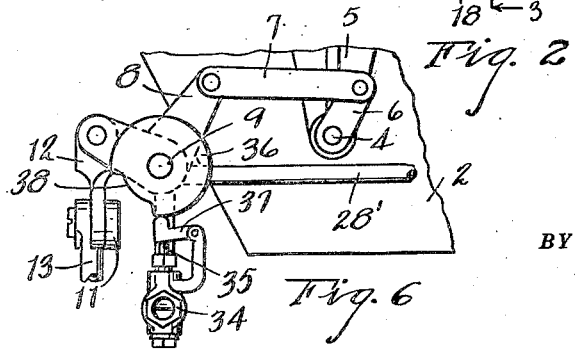
Fig. 6
INVENTOR
Charles T. Hatch
BY
Chappell Earl
ATTORNEY

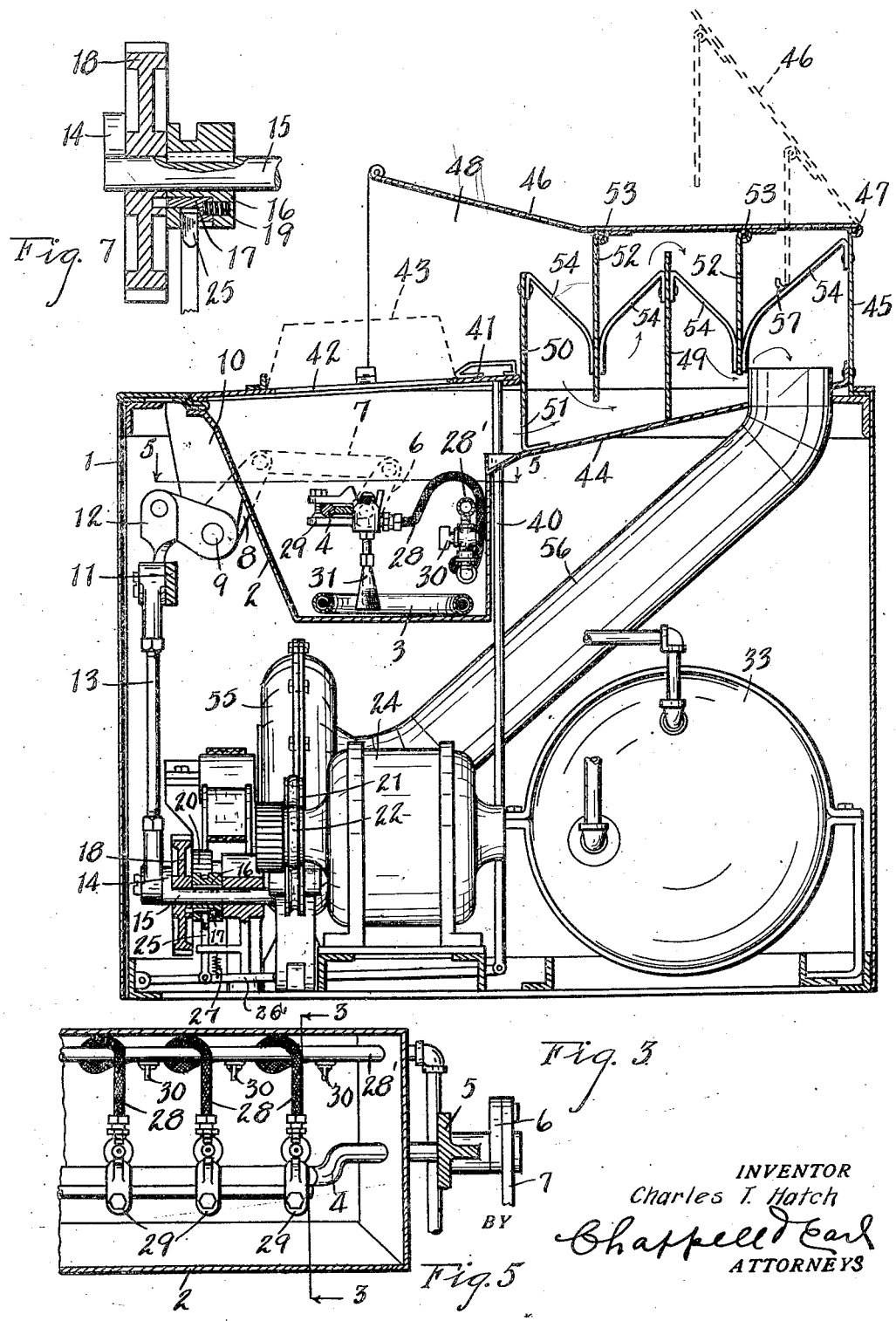

Patented Dec. 31, 1929

1,741,155

UNITED STATES PATENT OFFICE

CHARLES T. HATCH, OF ALBION, MICHIGAN, ASSIGNOR TO UNION STEEL PRODUCTS COMPANY, OF ALBION, MICHIGAN

COATING MACHINE

Application filed May 1, 1926. Serial No. 106,025.

My improved coating machine is especially designed by me for the greasing of baking pans and I have illustrated the same in this application as embodied in a commercial machine of that type. I am aware, however, that certain features of my improvements may be readily adapted for use in machines for spraying or coating objects with materials other than grease.

The objects of the invention are:

First, to provide an improved machine whereby pans or the like may be rapidly and evenly sprayed or coated with materials such as grease.

Second, to provide a machine of the character described which is very easily operated with uniform results and is of large capacity.

Third, to provide a structure of the class described in which the atomized grease escaping from the spraying tank or chamber is effectively collected or separated from the air.

Objects pertaining to details and economies of construction and operation of my invention will definitely appear from the detailed description to follow. The invention is clearly defined and pointed out in the claims.

A structure embodying the features of my invention is clearly illustrated in the accompanying drawing forming a part of this application, in which:

Fig. 1 is a front perspective view of a pan greasing machine embodying the features of my invention.

Fig. 2 is a fragmentary front elevation with the doors omitted.

Fig. 3 is a transverse vertical section on a line corresponding to line 3—3 of Figs. 1, 2 and 5, parts being shown in full lines for convenience in illustration.

Fig. 4 is a fragmentary perspective view showing details of the operating means.

Fig. 5 is a fragmentary horizontal section on a line corresponding to line 5—5 of Figs. 2 and 3.

Fig. 6 is a fragmentary view showing details of the operating means for the spray heads or nozzles and the valve control means.

Fig. 7 is a detail fragmentary view showing details of the control carriage.

Referring to the drawing, I provide a cabinet designated generally by the numeral 1 of such dimensions as to house the main parts of the machine. In the upper part of this housing I suspend a tank 2 for grease such as lard or other suitable material, this tank being provided with a heating coil indicated at 3. A rock shaft 4 extends longitudinally across this tank supported in suitable hangers 5 depending from the top of the cabinet or housing.

This rockshaft is provided with arms 6 at the ends thereof which are connected by the links 7 to one arm of the bell crank levers 8 pivoted at 9 on suitable hangers 10. These bell crank levers are connected by a cross bar 11 having arms 12 pivoted to the bell crank levers. This cross bar 11 is connected by the pitman 13 to the crank 14 of the driving shaft 15. The driving shaft 15 has a clutch member 16 thereon carrying the clutch pin 17 adapted when released to be shifted into engagement with the gear 18 by means of the spring 19.

The gear 18 is arranged in mesh with the pinion 20 which is connected by means of the pulley 21 and belt 22 to the shaft 23 of the motor indicated conventionally at 24. The details, however, of these particular driving connections for the motor are not a part of this invention.

The clutch is controlled by the cam 25, that is, the cam which is carried by the lever 26 held yieldingly upward by the spring 27 is normally in position to retract the clutch pin and hold it in retracted or disengaged position. However, when this lever 26 is actuated to withdraw the cam the clutch pin engages, thereby connecting the driving shaft with the gear 18 and rotating the driving shaft one complete revolution. The clutch pin is either withdrawn or disengaged by means of the control cam.

This, through the connections described, gives the rockshaft one complete oscillation and returns it to the central position shown in Fig. 3.

The nozzles are connected by the flexible connections 28 to the air conduit 28; these flexible connections not only permitting the oscillation of the nozzles but also the adjustment thereof longitudinally upon the rockshaft, the nozzles being secured by means of the clamps 29. Cut-off valves 30 are provided for the individual connections 28. The nozzle intakes 31 depend into the tank as illustrated.

The motor 24 also drives the air pump indicated at 32. This pump is connected to deliver to a tank 33, the tank being connected to the conduit 28' by means of a valve shown at 34, the stem of the valve being indicated at 35. This valve is held normally closed by means of the cam 36 acting upon the pivoted member 37 engaging the valve stem. The recessed portion 38 is of such length as to allow the valve to remain open during the oscillation of the nozzle-carrying rockshaft, the valve being automatically closed when the rockshaft returns to its initial position as shown in Fig. 3.

The control clutch lever 26 is actuated by means of a push rod 40 which projects upwardly at the rear of the tank to be engaged by the pan supporting table 41. This table has openings 42 above the spray nozzles so that a set of pans, one being indicated by dotted lines at 43, may be inverted over the spray nozzles. The pressure on the table by the operator placing the pans will actuate the push rod to permit the clutch to engage, thereby opening the valve and operating the rockshaft to swing the nozzles which delivers the spray effectively and uniformly over the inside of the pans.

To prevent the atomized grease from escaping into the room, to protect the operator and also to save the grease, I provide a separator means consisting of a separating chamber having a bottom 44 extending rearwardly from the top of the rear wall of the tank. This separating chamber has a rear wall 45, a top 46 hinged to the rear wall at 47 and side walls 48 depending from this top. Bottom baffles 49 and 50 project upwardly from the bottom 44, the front baffle 50 having openings 51 at the bottom thereof so that the air may be drawn directly from the top of the pan through these openings. The top has baffles 52 depending therefrom which, in the embodiment illustrated, are hinged to the top at 53.

Downwardly converging guides 54 are mounted on the baffles 49 and 50 and the rear walls in coacting pairs to guide the baffles 52 into a central vertical position relative to the baffles 49 and 50 and the rear wall 45. Several baffles are thus supported in staggered or alternating relation so that air passing through the separator means takes a zig-zag course. The front end of the top of this separating chamber overhangs the tank.

The exhaust fan or blower 55 is connected to the rear of the separator chamber by the pipe 56. This blower has driving connection to the motor.

With the parts thus arranged the air discharged by the nozzles is largely through the separator chamber and the grease coming into contact with the baffles is condensed and collected. The top may be swung to the position indicated by dotted lines, the rear guide 54 having a keeper 57 adapted to coact with the lower edge of the rear baffle 52 to support the top in its elevated position. In this position the several baffles are fully exposed so that the grease which has been collected thereon and on other interior surfaces of the separating chamber may be scraped off.

It is found that this separating chamber is highly efficient in separating the grease from the air.

It will be noted that the rockshaft is in the form of a crank, the purpose of this being to provide a mounting for the nozzles so that their tips are in a line approximately the axial center of the rockshaft. This secures a uniformity of distribution, that is, the relation of the nozzle tips to the pans being sprayed remains quite constant during the oscillation of the rockshaft, and further, the intake of the nozzle conduit is not materially lifted from the grease by the swinging movement.

My improved coating machine is of very large capacity and may be operated by little effort on the part of the operator who has merely to place the pans upon the table and remove the same, the table being pressed down at the time the pans are placed thereon sufficiently to actuate the clutch control means.

I have illustrated and described my improvements in one commercial embodiment which I have found satisfactory. I have not attempted to illustrate or describe certain modifications or adaptations which I contemplate as I believe this disclosure will enable those skilled in the art to embody or adapt my improvements as may be desired.

Having thus described my invention what I claim as new and desire to secure by Letters Patent is:

1. In a structure of the class described, the combination of a tank, a rockshaft disposed across said tank, a plurality of nozzles adjustably mounted on said rockshaft and provided with intakes depending into said tank, an air supply conduit, flexible connections for said conduit to said nozzles, a driving shaft provided with a crank, operating connections for said crank to said rockshaft whereby the rockshaft is given a full oscillation upon a complete rotation of said shaft, driving connections for said shaft including a clutch, a pan table disposed above said tank, a clutch control means including a push rod operatively associated with said pan table whereby pressure upon the pan table actuates the clutch, and means for automatically releasing the clutch.

2. In a structure of the class described, the combination of a tank, a rockshaft disposed across said tank, a plurality of nozzles adjustably mounted on said rockshaft and provided with intakes depending into said tank, an air supply conduit, flexible connections for said conduit to said nozzles, a pan table disposed above said tank, and means for actuating said rockshaft controlled by said table.

3. In a structure of the class described, the combination of a tank, a rockshaft disposed across said tank, a plurality of nozzles adjustably mounted on said rockshaft and provided with intakes depending into said tank, an air supply conduit, flexible connections for said conduit to said nozzles, a pan table disposed above said tank, and means for actuating said rockshaft.

4. In a structure of the class described, the combination of a tank, a rockshaft disposed across said tank, a plurality of nozzles adjustably mounted on said rockshaft and provided with intakes depending into said tank, an air supply conduit, flexible connections for said conduit to said nozzles, a control valve for said conduit, a cam operatively associated with said air control valve, means for oscillating said rockshaft and said cam including a clutch, a pan table disposed above said tank, a clutch control means including a push rod operatively associated with said pan table whereby pressure upon the pan table actuates the clutch, and means for automatically releasing the clutch at the end of a complete rotation thereof.

5. In a structure of the class described, the combination of a tank, a rockshaft disposed across said tank, a plurality of nozzles adjustably mounted on said rockshaft and provided with intakes depending into said tank, an air supply conduit, flexible connections for said conduit to said nozzles, a control valve for said conduit, a cam operatively associated with said air control valve, and means for oscillating said rockshaft and said cam.

6. In a structure of the class described, the combination of a tank, a rockshaft disposed across said tank, a plurality of nozzles adjustably mounted on said rockshaft and provided with intakes depending into said tank, an air supply conduit, flexible connections for said conduit to said nozzles, means for oscillating said rockshaft and said cam including a clutch, a pan table disposed above said tank, a clutch control means including a push rod operatively associated with said pan table whereby pressure upon the pan table actuates the clutch, and means for automatically releasing the clutch on the return of said clutch control means to its initial position on the completion of a cycle of operation.

7. In a structure of the class described, the combination of a tank, a rockshaft disposed across said tank, a plurality of nozzles adjustably mounted on said rockshaft and provided with intakes depending into said tank, an air supply conduit, flexible connections for said conduit to said nozzles, and means for oscillating said rockshaft and said cam.

8. In a structure of the class described, the combination of a tank, a rockshaft, a nozzle on said rockshaft, an air supply valve for said nozzle, operating connections for said rockshaft and said air valve, a driving shaft provided with a crank, operating connections for said crank to said rockshaft whereby the rockshaft is given a full oscillation upon a complete rotation of said shaft, driving connections for said shaft including a clutch, a pan table disposed above said tank, a clutch control means including a push rod operatively associated with said pan table whereby pressure upon the pan table actuates the clutch, and means for automatically releasing the clutch.

9. In a structure of the class described, the combination of a tank, a rockshaft, a nozzle on said rockshaft, an air supply valve for said nozzle, a cam operatively associated with said air valve and rockshaft, and operating means for said rockshaft.

10. In a structure of the class described, the combination of a tank, a rockshaft, a nozzle on said rockshaft, an air supply valve for said nozzle, operating connections for said rockshaft to said air valve, and operating means for said rockshaft.

11. In a structure of the class described, the combination of a tank, a rockshaft, a plurality of spray nozzles on said rockshaft, an air conduit disposed in parallel relation to said rockshaft, flexible air connections from said air conduit to said nozzles, means for actuating said rockshaft comprising a clutch, a pan table disposed above said tank and adapted to support the pans in inverted position above said nozzles, a clutch control means including a push rod operatively associated with said pan table to be actuated by pressure upon the table, a control valve for said air conduit, and a cam operatively connected to said rockshaft and adapted normally to hold said air valve in its closed position.

12. In a structure of the class described, the combination of a tank, a rockshaft, a plurality of spray nozzles on said rockshaft, intakes depending into said tank, an air conduit disposed in parallel relation to said rockshaft, flexible air connections from said air conduit to said nozzles, and means for actuating said rockshaft.

13. In a structure of the class described, the combination of a tank provided with heating means, a rockshaft extending longitudinally of the tank, a plurality of spray nozzles on said rockshaft, flexible air connections for said nozzles, means for actuating said rockshaft comprising a clutch, a pan table disposed above said tank and adapted to support the pans in inverted position above said nozzles, a clutch control means including a push rod operatively associated with said pan table to be actuated by pressure upon the table, an air control valve, and operating connections for said air valve to said rockshaft.

14. In a structure of the class described, the combination of a tank provided with heating means, a rockshaft extending longitudinally of the tank, a plurality of spray nozzles on said rockshaft, flexible air connections for said nozzles, means for actuating said rockshaft, an air control valve, and operating connections for said air valve to said rockshaft.

15. In a structure of the class described, the combination of a tank, a rockshaft, a spray nozzle on said rockshaft, an air valve for said nozzle, means for actuating said rockshaft comprising a clutch, a pan table disposed above said tank and adapted to support the pans in inverted position above said nozzles, a clutch control means including a push rod operatively associated with said pan table to be actuated by pressure upon the table, and a cam adapted normally to hold said air valve in its closed position.

16. In a structure of the class described, the combination of a tank, a rockshaft, a spray nozzle on said rockshaft, means for supplying air under pressure to said nozzle including a valve, means for actuating said rockshaft, and a cam on said rockshaft adapted normally to hold said air valve in its closed position.

17. In a structure of the class described, the combination of a tank, a spray nozzle on said rockshaft, an air valve for said nozzle, means for actuating said rockshaft comprising a clutch, a pan table disposed above said tank and adapted to support the pans in inverted position above said nozzles, a clutch control means including a push rod operatively associated with said pan table to be actuated by pressure upon the table, and operating connections for said air valve to said rockshaft.

18. In a structure of the class described, the combination of a tank, an oscillatingly mounted spray nozzle, a control valve therefor, a pan table disposed above said tank, and means for simultaneously opening said valve and oscillating said nozzle controlled by said pan table.

19. In a structure of the class described, the combination of an oscillatingly mounted spray nozzle, a pan support, a control valve for said nozzle, and means for synchronously oscillating said spray nozzle controlled by said pan support.

20. In a structure of the class described, the combination of an oscillatingly mounted nozzle, a control valve for said nozzle, means for actuating said nozzle, and operating connections for said nozzle actuating means and said control valve.

21. In a structure of the class described, the combination of a rockshaft, a plurality of spray nozzles on said rockshaft, an air supply valve for said nozzles, and operating connections for said air supply valve to said rockshaft.

22. In a structure of the class described, the combination of an oscillatingly mounted spray nozzle, a control valve for said nozzle, and means for synchronously operating said spray nozzle and opening said control valve.

In witness whereof I have hereunto set my hand.

CHARLES T. HATCH.